US009114796B2

(12) United States Patent
Martin et al.

(10) Patent No.: US 9,114,796 B2
(45) Date of Patent: Aug. 25, 2015

(54) INLET AIR TEMPERATURE SENSOR DIAGNOSTICS (75) Inventors: Douglas Raymond Martin, Canton, MI (US); Michael Stephen Sweppy, Manchester, MI (US); Matthew D. Smith, Dearborn Heights, MI (US); John Smiley, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 351 days.

(21) Appl. No.: 13/424,224

(22) Filed: Mar. 19, 2012

(65) Prior Publication Data

US 2013/0245867 A1 Sep. 19, 2013

(51) Int. Cl.
*B60W 10/06* (2006.01)
*F02D 41/22* (2006.01)
*B60W 50/00* (2006.01)
*B60W 10/08* (2006.01)
*F02D 41/04* (2006.01)
*F02D 41/06* (2006.01)
*F02D 13/02* (2006.01)
*F02D 19/08* (2006.01)
*F02B 75/12* (2006.01)

(52) U.S. Cl.
CPC ............... *B60W 10/06* (2013.01); *B60W 10/08* (2013.01); *B60W 50/0098* (2013.01); *F02D 41/222* (2013.01); *B60W 2050/0085* (2013.01); *B60W 2510/0676* (2013.01); *B60W 2550/12* (2013.01); *F02B 2075/125* (2013.01); *F02D 13/0207* (2013.01); *F02D 13/0219* (2013.01); *F02D 19/084* (2013.01); *F02D 41/042* (2013.01); *F02D 41/062* (2013.01); *F02D 2200/0414* (2013.01); *Y02T 10/36* (2013.01)

(58) Field of Classification Search
CPC . B60W 10/06; B60W 50/0098; B60W 10/08; F02D 41/222
See application file for complete search history.

(56) References Cited

U.S. PATENT DOCUMENTS

| 7,599,786 | B2 | 10/2009 | Utsumi et al. | |
|---|---|---|---|---|
| 7,818,997 | B2 | 10/2010 | Iwai | |
| 2010/0076635 | A1 | 3/2010 | Sugimoto | |
| 2010/0241297 | A1* | 9/2010 | Aoki et al. | 701/22 |
| 2010/0269802 | A1 | 10/2010 | Nakashima et al. | |
| 2012/0051388 | A1* | 3/2012 | Hamama et al. | 374/1 |

* cited by examiner

*Primary Examiner* — Fadey Jabr
*Assistant Examiner* — Basil T Jos
(74) *Attorney, Agent, or Firm* — Julia Voutyras; Alleman Hall McCoy Russell & Tuttle LLP (57) ABSTRACT Methods and systems are provided for diagnosing an intake air temperature sensor in a hybrid electric vehicle. An engine temperature is compared to each of an intake air temperature sensed before an engine start but after sufficient engine soak, as well as an intake air temperature sensed after selected vehicle operating conditions have elapsed since the engine start. Based on discrepancies between the air temperature and the engine temperature, degradation of the sensor is determined.

19 Claims, 5 Drawing Sheets

INLET AIR TEMPERATURE SENSOR DIAGNOSTICS

FIELD

The present application relates to monitoring the performance of an intake air temperature sensor.

BACKGROUND AND SUMMARY

Vehicles may be configured with an inlet air temperature sensor for estimating a temperature of fresh air entering a vehicle engine. Based on the intake air temperature, air mass and/or air volume estimations may be made, which may then be used for air-to-fuel ratio control. The inlet air temperature sensor may need to be periodically diagnosed to ensure proper functionality.

One example approach for diagnosing an inlet air temperature sensor is shown by Iwai in U.S. Pat. No. 7,818,997. Therein, degradation of the inlet air temperature (IAT) sensor is determined, after an engine soak duration has elapsed, based on the magnitude of deviation between a lowest temperature estimated by the IAT sensor and an engine coolant temperature estimated by a water temperature sensor.

However, the inventors herein have identified potential issues with such an approach. As an example, in hybrid vehicle systems, the vehicle may be operated without running an internal combustion engine for extended periods of time. In particular, the engine may not be operated long enough to ensure that a sufficient amount of ambient air has passed over the IAT sensor. As a result, IAT sensor results may not be reliable. In addition, there may be conditions where the diagnostic routine cannot be completed.

In one example, some of the above issues may be at least partly addressed by a method for a hybrid vehicle comprising, during vehicle operation, when intake air temperature, sensed before an engine start but after an engine soak, disagrees with engine temperature, lowering a vehicle speed threshold at which an automatic engine shutdown is enabled from a first, higher speed to a second, lower speed. In this way, engine running may be prolonged to enable a sufficient amount of ambient air to flow over the IAT sensor.

For example, following a vehicle key-on event in a hybrid vehicle, wherein the engine has sufficiently soaked, an intake air temperature (IAT) estimated by an intake air temperature sensor may be compared to an engine coolant temperature (ECT) estimated by an engine coolant temperature sensor before the engine is started. If the estimated temperatures agree (e.g., differs by less than a threshold amount), no degradation of the IAT sensor may be determined. However, if the temperatures do not agree (e.g., differs by more than the threshold amount), IAT sensor degradation may be possible. To confirm, the temperatures may be re-evaluated after a duration of engine running that ensures that sufficient air has flown over the IAT sensor. Specifically, a vehicle speed threshold at which the engine is automatically shutdown may be lowered. As such, this prolongs a duration of hybrid vehicle operation with the engine running.

The temperatures may be re-estimated after a duration of engine running while a vehicle speed is higher than a threshold, while an air mass level being higher than a threshold, and with no extended tip-out events. As such, the selected conditions reflect operating conditions that better ensure that a sufficient amount of ambient air has passed over the IAT sensor. If the re-estimated temperatures continue to disagree, then IAT sensor degradation may be confirmed. Else, if the temperatures agree upon re-evaluation, no sensor degradation is determined and the vehicle speed threshold may be reset.

In this way, IAT sensor degradation may be more reliably confirmed in a hybrid vehicle. Specifically, by verifying that sufficient fresh air mass has passed over the sensor, the integrity of the diagnostic routine is improved. By delaying automatic engine shutdowns until lower vehicle speeds, in response to an initial temperature disagreement, the diagnostic routine may be rapidly completed with reduced impact on engine-on times. By reliably and rapidly diagnosing an IAT sensor, vehicle performance is improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
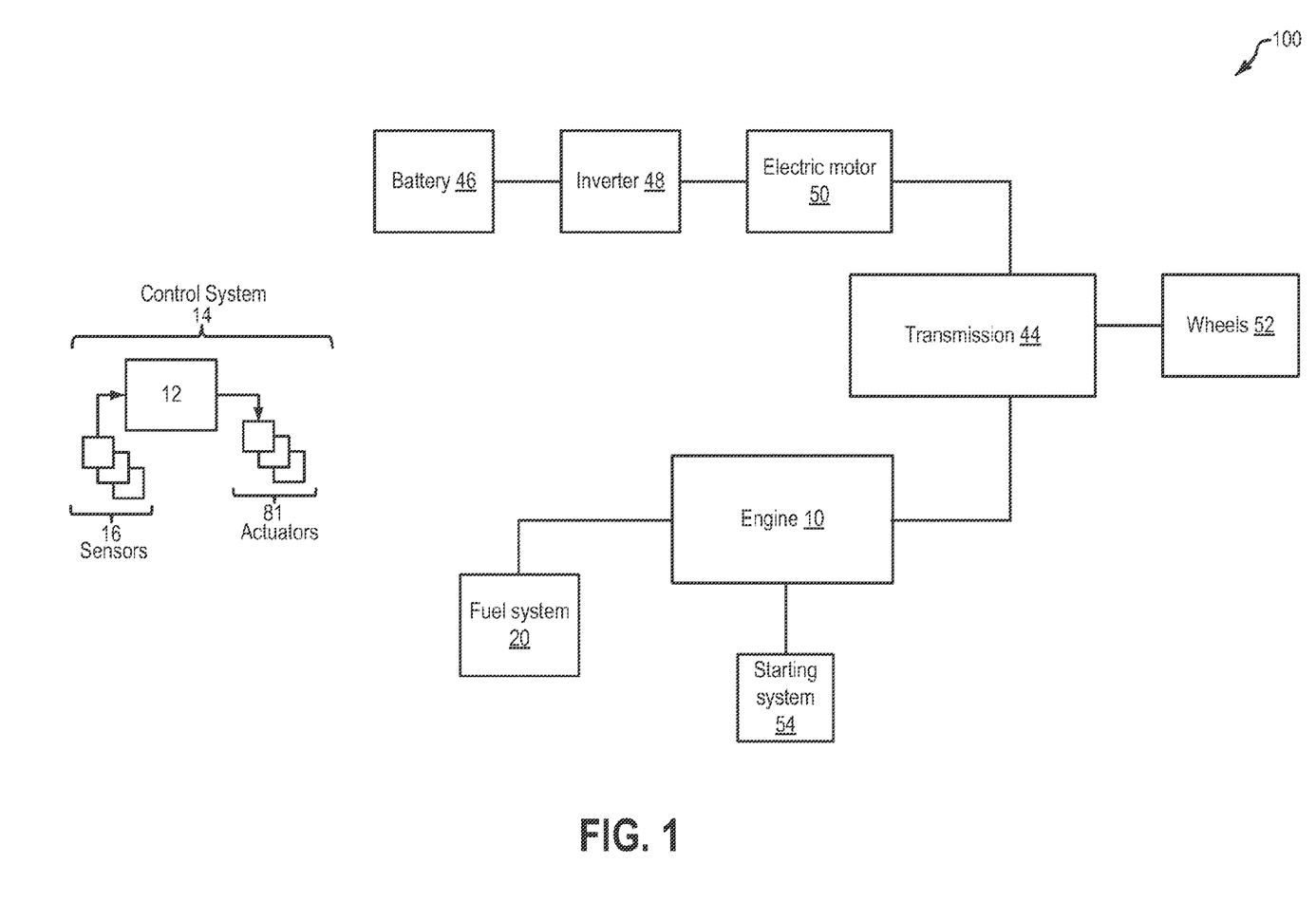
FIG. 1 illustrates an example hybrid vehicle system.
Figure 2:
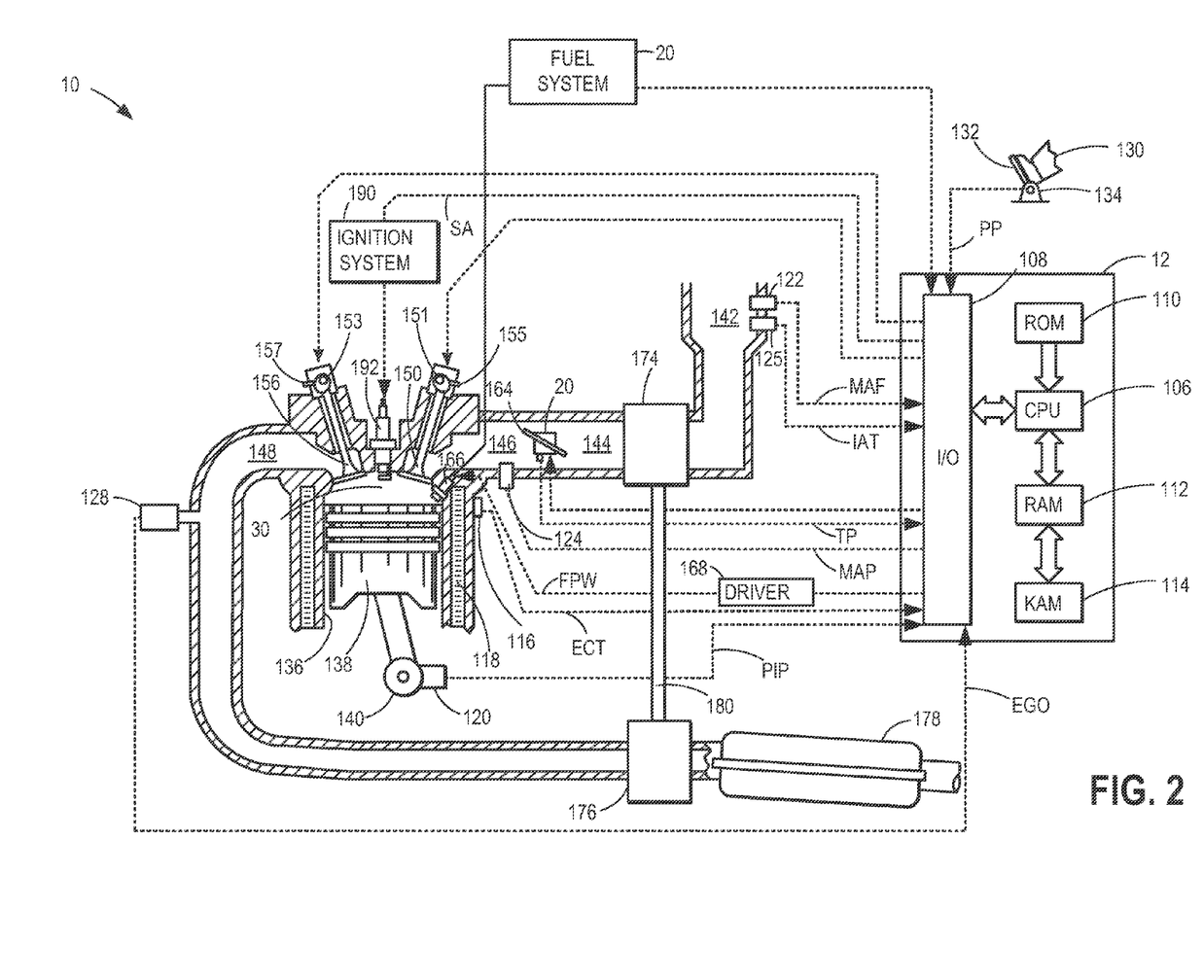
FIG. 2 illustrates an example internal combustion engine.
Figure 4:
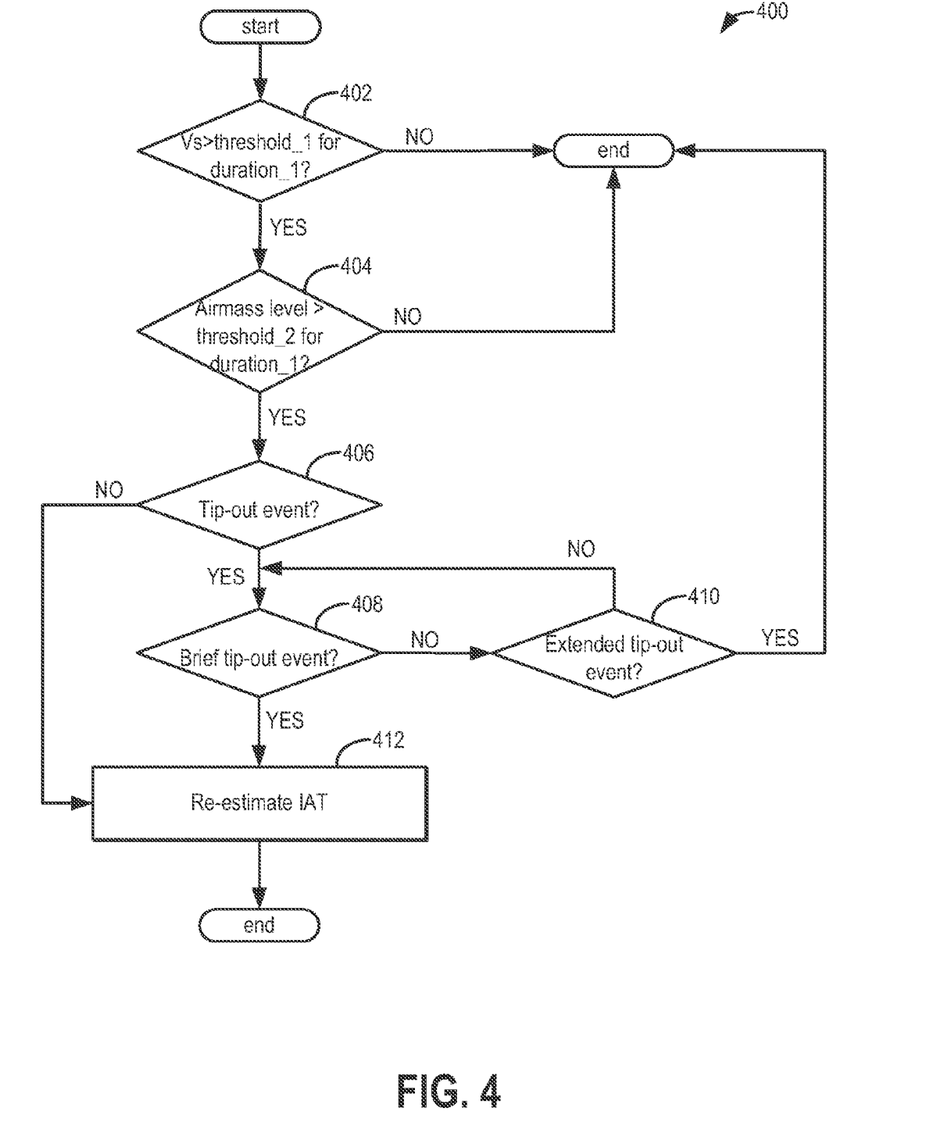
FIG. 4 illustrates a high level flow chart for re-evaluating an intake air temperature following an initial disagreement between an estimated intake air temperature and an engine coolant temperature.
Figure 5A:
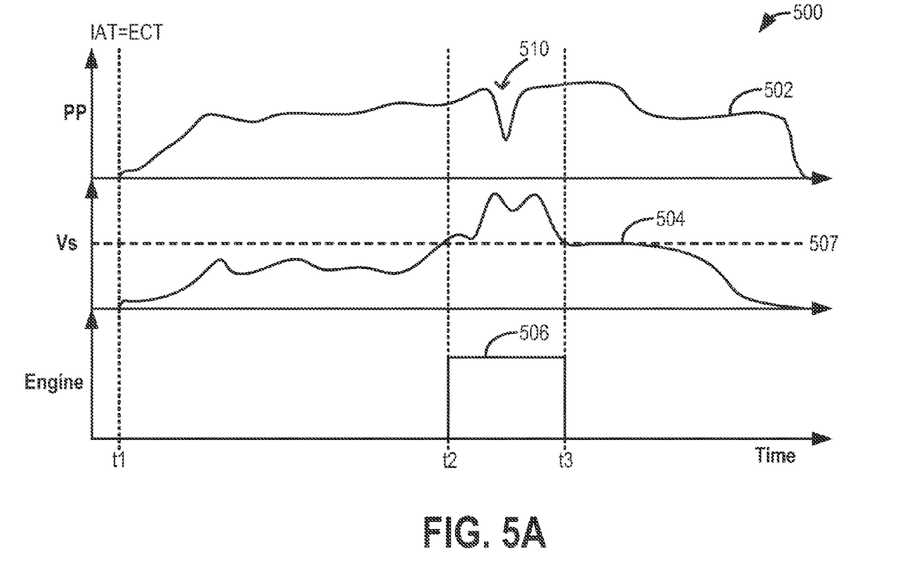
FIGS. 5A-B illustrates example vehicle speed threshold adjustments and intake air temperature sensor diagnostics.
Figure 5B:
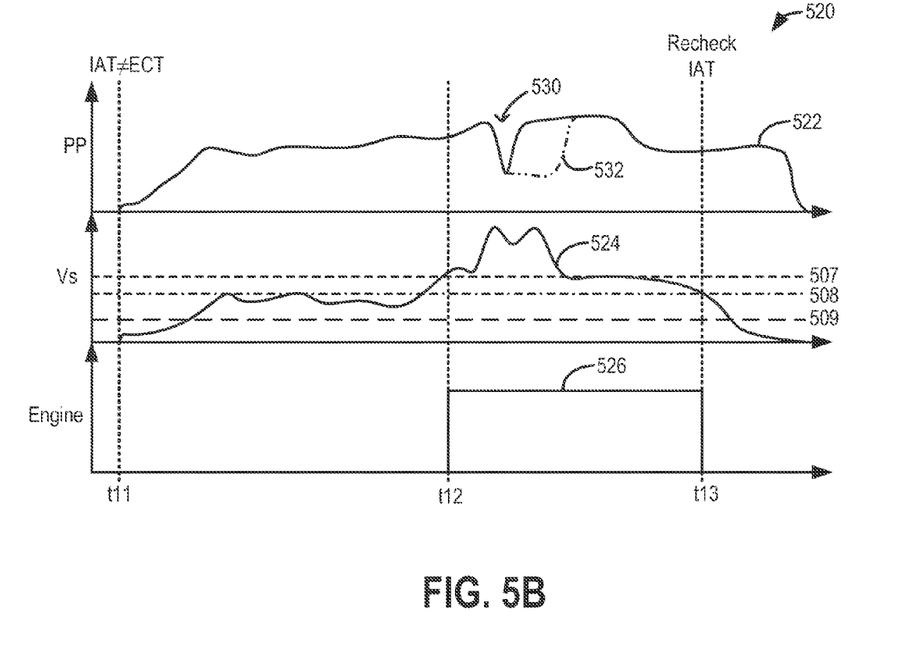

The following description relates to systems and methods for diagnosing an intake air temperature (IAT) sensor used in a hybrid vehicle, such as the hybrid electric vehicle system (HEV) of FIGS. 1-2. In response to an initial disagreement between an estimated intake air temperature and an engine coolant temperature, the intake air temperature may be re-evaluated after selected conditions are met. An engine controller may be configured to perform a control routine, such as the routine of FIG. 3, to lower a vehicle speed threshold at which an automatic engine shutdown is enabled in response to the initial disagreement. The controller may be further configured to re-evaluate the temperatures upon ensuring that a sufficient amount of ambient air has passed over the sensor, as shown in FIG. 4. Based on discrepancies between the engine coolant temperature and the revised intake air temperature, IAT sensor degradation may be indicated. If no discrepancies are found upon re-evaluation, the sensor may be determined to be functional and the vehicle speed threshold may be readjusted to the original setting. Example vehicle speed threshold adjustments and IAT sensor diagnostics are shown at FIGS. 5A-B. In this way, an intake air temperature sensor may be reliably diagnosed in a hybrid vehicle with minimal intrusion of vehicle operation.

FIG. 1 depicts a hybrid propulsion system 100 for a vehicle. In the depicted embodiment, the vehicle is a hybrid electric vehicle (HEV). Hybrid propulsion system 100 includes an internal combustion engine 10. Engine 10 is coupled to transmission 44. Transmission 44 may be a manual transmission, automatic transmission, or combinations thereof. Transmission 44 may include a gear set (not shown) having a plurality of gears. Further, various additional components may be included, such as a torque converter, a final drive unit, etc. Transmission 44 is shown coupled to drive wheels 52, which may contact a road surface.

Transmission 44 may alternatively be driven by an electric motor 50. In the depicted embodiment, the motor is a battery-powered electric motor wherein electric motor 50 is powered by energy stored battery 46. Other energy storage devices that may be used to power motor 50 include a capacitor, a flywheel, a pressure vessel, etc. An energy conversion device, herein inverter 48, may be configured to convert the DC output of battery 46 into an AC output for use by electric motor 50. Electric motor 50 may also be operated in a regenerative mode, that is, as a generator, to absorb energy from vehicle motion and/or the engine and convert the absorbed energy to an energy form suitable for storage in battery 46. Furthermore, electric motor 50 may be operated as a motor or generator, as required, to augment or absorb torque during a transition of engine 10 between different combustion modes (e.g., during transitions between a spark ignition mode and a compression ignition mode).

Engine 10 may be started with an engine starting system 54, including a starter motor. In one example, the starter motor coupled to the engine may be battery-operated, wherein the starter motor is driven by energy from battery 46. In another example, the starter motor may be a powertrain drive motor, such as a hybrid power-plant connected to the engine by way of a coupling device. The coupling device may include a transmission, one or more gears, and/or any other suitable coupling device. The starter may be configured to support engine restart at or below a predetermined near zero threshold speed (e.g., below 50 or 100 rpm). In other words, by operating the starter motor of starting system 54, the engine 10 may be spun.

Hybrid propulsion system 100 may be operated in various embodiments including a full hybrid system, wherein the vehicle is driven by only the engine, only the electric motor, or a combination of both. Alternatively, assist or mild hybrid embodiments may also be employed, wherein the engine is the primary source of torque, and the electric motor selectively adds torque during specific conditions, such as during a tip-in event. Accordingly, hybrid propulsion system 100 may be operated in various modes of operation. For example, during an "engine-on" mode, engine 10 may be operated and used as the primary source of torque for powering wheels 52. During the "engine-on" mode, fuel may be supplied to engine 10 from fuel system 20 including a fuel tank. The fuel tank may hold a plurality of fuels, such as gasoline, or fuel blends, such as fuel with a range of alcohol (e.g., ethanol) concentrations including E10, E85, etc., and combinations thereof. In another example, during an "engine-off" (or electric-only) mode, electric motor 50 may be operated to power the wheels. The "engine-off" mode may be employed during braking, low speeds, while stopped at traffic lights, etc. In still another example, during an "assist" mode, an alternate torque source may supplement and act in cooperation with the torque provided by engine 10.

Each of engine 10 and electric motor 50 may also be used to apply a braking torque on wheels 52 to reduce a vehicle speed. That is, the vehicle speed may be reduced using engine braking torque and/or regenerative braking torque. As used herein, the regenerative braking torque corresponds to a negative torque that is applied by the electric motor on the vehicle wheels via the vehicle driveline (e.g., transmission, torque converter, etc.). Specifically, excess kinetic energy corresponding to the excess vehicle speed (that is, the difference between the estimated vehicle speed and the desired vehicle speed) is converted to, and stored as, electrical energy in the battery coupled to the electric motor. In comparison, the engine braking torque (herein also referred to as a compression braking torque) is a negative torque applied by the engine on the vehicle wheels via the driveline. Specifically, the excess kinetic energy corresponding to the excess vehicle speed is taken away from the moving wheels and used to keep the engine spinning and to compress air in the engine cylinders, after fuel has been shut-off to the engine (in response to a preceding accelerator pedal foot-off event).

Hybrid propulsion system 100 may further include control system 14. Control system 14 is shown receiving information from a plurality of sensors 16 (various examples of which are described herein) and sending control signals to a plurality of actuators 81 (various examples of which are described herein and in FIG. 2). As one example, sensors 16 may include various pressure and temperature sensors, a fuel level sensor, various exhaust gas sensors, etc. The control system may also send control signals to the actuators 81 based on input received from a vehicle operator. The various actuators may include, for example, the transmission gear set (not shown), cylinder fuel injectors (not shown), an air intake throttle coupled to the engine intake manifold (not shown), etc. The control system 14 may include a controller 12. The controller may receive input data from the various sensors or buttons, process the input data, and trigger the actuators in response to the processed input data based on instruction or code programmed therein corresponding to one or more routines. Example control routines are described herein with regard to FIGS. 3-4.

FIG. 2 depicts an example embodiment of a combustion chamber or cylinder of engine 10 (of FIG. 1). Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 30 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor (FIG. 1) may be coupled to crankshaft 140 via a flywheel to enable a starting operation of engine 10.

Cylinder 30 can receive intake air via a series of intake air passages 142, 144, and 146. Intake air passage 146 can communicate with other cylinders of engine 10 in addition to cylinder 30. In some embodiments, one or more of the intake passages may include a boosting device such as a turbocharger or a supercharger. For example, FIG. 2 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 2, or alternatively may be provided upstream of compressor 174.

Intake air temperature (IAT) may be estimated by inlet air temperature sensor 125. Specifically, the intake air temperature sensor 125 may estimate a temperature of the intake air flowing into cylinder 30 via intake passage 142. As such, IAT sensor 125 may need to be periodically diagnosed. For example, following receipt of a vehicle start request from a vehicle operator (such as in the vehicle of FIG. 1), a controller may verify that a sufficient engine soak time has elapsed wherein the engine may have returned to an ambient temperature. Specifically, the controller may confirm that the vehicle has been off and not driven (e.g., parked) with the engine not running for a selected engine soak duration (e.g., for 6 hours). By allowing the engine to soak for the selected soak duration, the engine may be allowed to cool and an engine temperature may be given time to stabilize to an ambient temperature. Then, before starting the engine and operating the vehicle, the intake air temperature (IAT) estimated by IAT sensor 125 may be compared to an engine coolant temperature (ECT) estimated by engine coolant temperature sensor 116. ECT sensor 116 may be coupled to cooling sleeve 118 and may estimate a temperature of cooling water flowing in the cooling sleeve.

As such, following a sufficient engine soak time, before the engine is started, the estimated IAT and the estimated ECT are expected to substantially match (e.g., differ by less than a threshold). However, hybrid vehicles may be operated for extended durations using an electric motor only. The reduced engine operation time means reduced exposure of the IAT sensor 125 to ambient intake air. As a result, the IAT reading at engine start may not match the ECT (e.g., may differ by more than a threshold) even though the IAT sensor is not degraded. As elaborated herein with reference to FIGS. 3-4, in response to an initial disagreement between the estimated IAT and ECT temperature readings, a vehicle speed threshold below which the engine is automatically shutdown may be lowered to prolong engine operation times. The IAT may then be re-estimated after the vehicle has been operating above a threshold speed for a threshold duration, after an intake air mass level has remained above a threshold level for a threshold duration, and while no extended tip-outs have occurred. If after re-evaluation, the revised IAT estimate continues to not match the estimated ECT, degradation of the IAT sensor may be confirmed. As such, the IAT sensor may be degraded, for example, due to wear and tear, age, or an electrical fault (e.g., a break or a short-circuit). If after re-evaluation, the revised IAT estimate does match the estimated ECT, no degradation of the IAT sensor may be confirmed, and the vehicle speed threshold for an automatic engine shutdown may be reset to the higher speed value.

Exhaust passage 148 can receive exhaust gases from other cylinders of engine 10 in addition to cylinder 30. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 30 is shown including at least one intake poppet valve 150 and at least one exhaust poppet valve 156 located at an upper region of cylinder 30. In some embodiments, each cylinder of engine 10, including cylinder 30, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 30 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 30 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 30 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more injectors for providing a knock or pre-ignition suppressing fluid thereto. In some embodiments, the fluid may be a fuel, wherein the injector is also referred to as a fuel injector. As a non-limiting example, cylinder 30 is shown including one fuel injector 166. Fuel injector 166 is shown coupled directly to cylinder 30 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 30. While FIG. 2 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing.

Fuel may be delivered to fuel injector 166 from a high pressure fuel system 20 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 30.

As described above, FIG. 2 shows only one cylinder of a multi-cylinder engine. As such each cylinder may similarly include its own set of intake/exhaust valves, fuel injector(s), spark plug, etc.

Fuel tanks in fuel system 20 may hold fuel with different qualities, such as different compositions. These differences may include different alcohol content, different octane, different heat of vaporizations, different fuel blends, and/or combinations thereof etc. In one example, fuels with different alcohol contents could include one fuel being gasoline and the other being ethanol or methanol. In another example, the engine may use gasoline as a first substance and an alcohol containing fuel blend such as E85 (which is approximately 85% ethanol and 15% gasoline) or M85 (which is approximately 85% methanol and 15% gasoline) as a second substance. Other alcohol containing fuels could be a mixture of alcohol and water, a mixture of alcohol, water and gasoline etc.

Controller 12 is shown in FIG. 2 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; intake air temperature (IAT) from intake air temperature sensor 125; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; absolute manifold pressure signal (MAP) from sensor 124, cylinder AFR from EGO sensor 128, and abnormal combustion from a knock sensor. Engine speed signal, RPM, may be generated by controller 12 from signal PIP. Manifold pressure signal MAP from a manifold pressure sensor may be used to provide an indication of vacuum, or pressure, in the intake manifold.

Storage medium read-only memory 110 can be programmed with computer readable data representing instructions executable by processor 106 for performing the methods described below as well as other variants that are anticipated but not specifically listed.

In this way, the system of FIGS. 1-2 enables a method of diagnosing an intake air temperature sensor in a hybrid vehicle wherein during vehicle operation, when intake air temperature sensed before an engine start but after an engine soak disagrees with engine temperature, a vehicle speed threshold at which an automatic engine shutdown is enabled is lowered from a first, higher speed to a second, lower speed. The system further enables the intake air temperature to be re-sensed after selected vehicle operating conditions are met so that intake air temperature sensor degradation can be indicated based on the re-sensed intake air temperature relative to the engine temperature.

Figure 3:
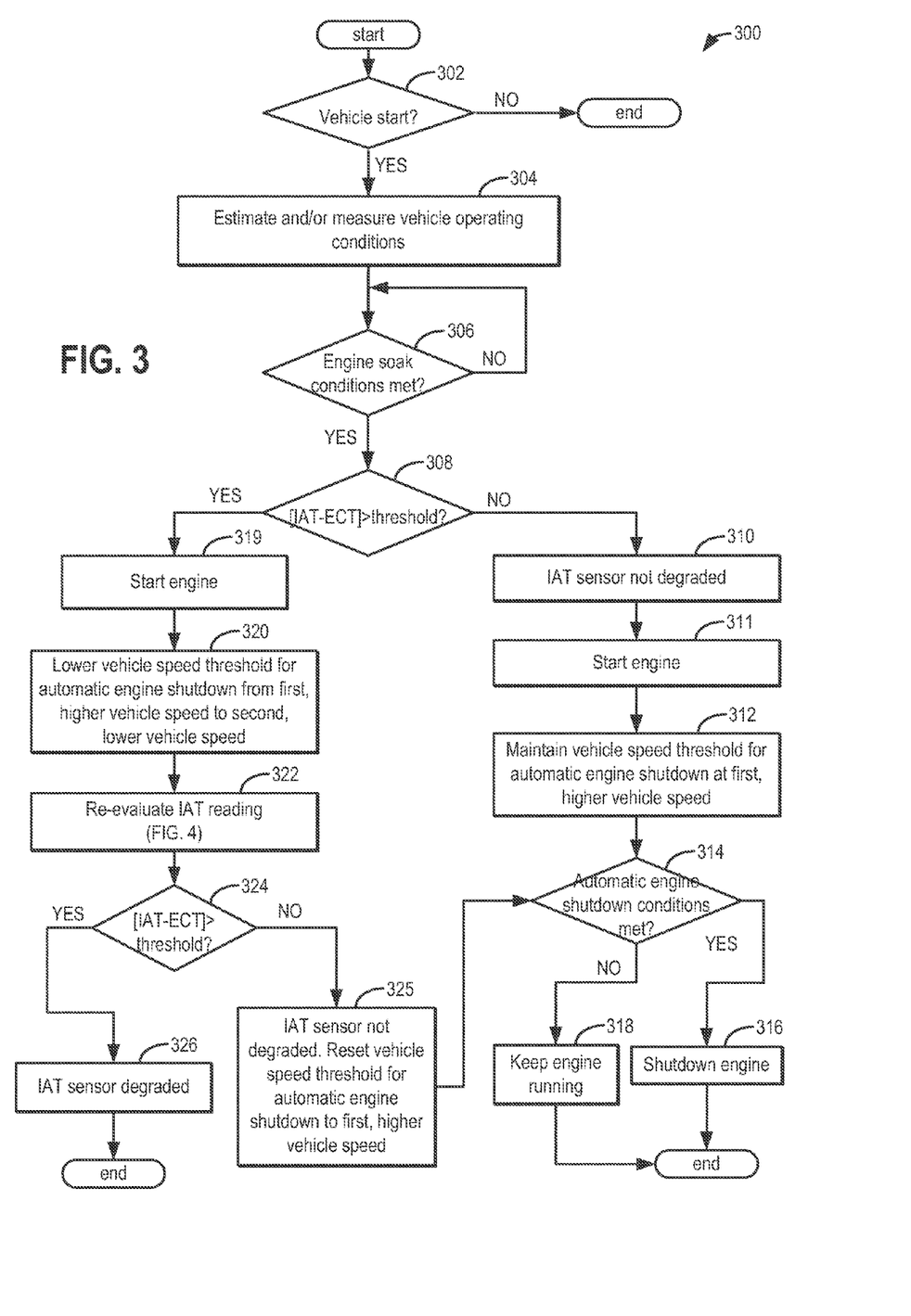
FIG. 3 illustrates a high level flow chart for diagnosing an intake air temperature sensor of the vehicle system of FIG. 1.

Now turning to FIG. 3, an example routine 300 is shown for diagnosing an intake air temperature sensor in a hybrid vehicle at the onset of vehicle operation. The routine allows engine operation to be prolonged in response to an initial disagreement between estimated engine and air temperatures so that sufficient ambient air can flow over the IAT sensor. Sensor degradation can then be determined based on a re-evaluated IAT sensor output.

At 302, a vehicle start may be confirmed. This may include, for example, confirming that a vehicle start request has been received from the operator. The operator may indicate a desire to start the vehicle by inserting a key into the ignition slot (herein, also referred to as a key-on event) or by pressing an engine start/stop button, for example. If a vehicle start is not confirmed, the routine may end.

Upon confirming the vehicle start, at 304, the routine includes estimating and/or measuring vehicle operating conditions. These may include, for example, ambient conditions (temperature, pressure, humidity, etc.), battery state of charge, pedal position, driver torque demand, cabin heating/cooling requests, air conditioner compressor air level, engine temperature, manifold temperature, manifold pressure, manifold air flow, etc. As such, the vehicle operating conditions may be estimated before starting the engine.

At 306, engine soak conditions may be confirmed. This may include confirming that the engine has been off with the vehicle also off and not being driven. For example, the vehicle may be parked with the engine off. In addition, it may be confirmed that the vehicle and engine have been off for a selected duration (e.g., for 6 hours) that allows the engine to cool and an engine temperature to stabilize to an ambient temperature.

At 308, a sensed intake air temperature may be compared to an estimated engine temperature, before the engine is started, and it may be determined if they do not disagree. In one example, the engine temperature may be based on an engine coolant temperature estimated by an engine coolant temperature sensor (such as ECT sensor 116 of FIG. 2). Likewise, an intake air temperature may be estimated by an intake air temperature sensor (such as IAT sensor 125 of FIG. 2). As used herein, the intake air temperature disagreeing with the engine temperature may include an absolute difference between the sensed intake air temperature (IAT) and the engine coolant temperature (ECT) being higher than a threshold difference.

If the intake air temperature, sensed before an engine start but after an engine soak, agrees with engine temperature, then at 310 it may be determined that the intake air temperature sensor is not degraded. At 311, the engine may be started, if required, to operate the vehicle. At 312, in response to the indication of no intake air temperature sensor degradation, a vehicle speed threshold at which an automatic engine shutdown is enabled may be maintained at a first, higher vehicle speed (e.g., at 62 mph). As such, the speed threshold is one of a plurality of vehicle operating parameters that are assessed by a vehicle controller when deciding whether to automatically shutdown the engine, as elaborated below.

At 314, it may be determined if automatic engine shutdown conditions have been met. The automatic shutdown conditions may include, for example, a system battery state of charge (SOC) being higher than a threshold (e.g., a battery SOC above 30%), indicating that the battery is sufficiently charged. The conditions may further include a pedal position being less than a threshold position, indicating that the torque requested by the vehicle operator is less than a threshold. In addition, it may be confirmed that no request for operating an air conditioner has been received (e.g., no cabin cooling was requested by the operator). It may also be confirmed that an exhaust catalyst temperature is above a threshold temperature. If all the parameters are confirmed, and further if the operating vehicle speed requested by the operator is less than the first, higher threshold speed, at 316, a vehicle controller may automatically shutdown the engine. That is, the engine may be shutdown without receiving an explicit shutdown request from the vehicle operator. Automatically shutting down the engine may further include operating the hybrid vehicle using a motor (e.g., the electric motor of FIG. 1).

If any of the automatic engine shutdown conditions are not met, then at 318, the controller may keep the engine running so that the vehicle continues to be operated with at least some power from the engine. It will be appreciated that while running the engine to operate the vehicle, the vehicle may be in an engine-only mode with only the engine powering the vehicle, or an engine-assist mode with the engine assisting the electric motor in powering the vehicle.

Returning to 308, if the intake air temperature, sensed before an engine start but after an engine soak, disagrees with engine temperature, then intake air temperature sensor degradation may be possible. To confirm, the temperature readings may be re-evaluated after running the engine for a duration during which sufficient ambient air may have passed over the IAT sensor. Specifically, in response to the absolute difference between the sensed intake air temperature and the engine coolant temperature being higher than the threshold difference, at 319, the engine may be restarted. Further, at 320, the routine includes lowering the vehicle speed threshold at which the automatic engine shutdown is enabled from the first, higher speed to a second, lower speed. As an example, the vehicle speed threshold may be lowered from 62 mph to 33 mph.

Lowering the vehicle speed threshold includes, automatically shutting down the engine when a vehicle speed drops below the second, lower speed (e.g., below 33 mph) when the sensed intake air temperature disagrees with the engine temperature in comparison to automatically shutting down the engine when the vehicle speed drops below the first, higher speed (e.g., below 62 mph) when the sensed intake air temperature agrees with the engine temperature (assuming all other automatic engine shutdown conditions have been met). By lowering the vehicle speed threshold at which the automatic engine shutdown is enabled, an engine running mode of vehicle operation may be prolonged.

At 322, the routine includes re-evaluating the intake air temperature sensor reading. As elaborated herein with reference to FIG. 4, this includes re-sensing the intake air temperature after selected vehicle operating conditions are met since the engine start, and indicating intake air temperature sensor degradation based on the re-sensed intake air temperature relative to the engine temperature.

At 324, the re-sensed intake air temperature may be compared to the (original) engine coolant temperature reading to determine if the temperatures agree or disagree. Specifically, an absolute difference between the re-sensed intake air temperature (IAT) and the engine coolant temperature (ECT) may be determined. The re-sensed intake air temperature may be determined to agree with the engine temperature if the absolute difference between the re-sensed intake air temperature and the engine temperature is lower than the threshold difference, while the re-sensed intake air temperature may be determined to disagree with the engine temperature if the absolute difference between the re-sensed intake air temperature and the engine temperature is higher than the threshold difference.

At 325, if the re-sensed intake air temperature agrees with the engine temperature, no intake air temperature sensor degradation may be indicated. Additionally, in response to the indication of no intake air temperature sensor degradation, the vehicle controller may reset the vehicle speed threshold at which the automatic engine shutdown is enabled from the second, lower speed to the first, higher speed. From here the routine may return to 314 to confirm automatic engine shutdown conditions. If all the automatic engine shutdown conditions are met, including the vehicle operating at a speed below the first, higher threshold, the engine may be automatically shutdown (at 316). Else, the engine may be kept running (at 318).

If the re-sensed intake air temperature disagrees with the engine temperature (ECT) at 324, then at 326, the routine includes indicating intake air temperature sensor degradation by setting a diagnostic code. For example, a malfunction indication light may be illuminated to indicate the degradation to the vehicle operator.

In one example, a hybrid vehicle may be operated in a first mode if the engine temperature and the intake air temperature agree at a key-on event. During the first mode of operation, the vehicle may operate with a first, higher vehicle speed setting for automatically shutting the engine. The hybrid vehicle may be shifted to a second mode of operation if the engine temperature and the intake air temperature disagree at a key-on event and also disagree at a later time after the selected operating conditions are met. During the second mode of operation, the vehicle may operate with a second, lower vehicle speed setting for automatically shutting the engine. The hybrid vehicle may be shifted to a third mode of operation if the engine temperature and the intake air temperature disagree at a key-on event but agree at a later time after the selected operating conditions are met. During the third mode of operation, after the initial disagreement and until the intake air temperature is reassessed, the vehicle may operate with the second, lower vehicle speed setting for automatically shutting the engine. Then, after the intake air temperature is reassessed and found to agree with the engine temperature, the vehicle speed setting for automatically shutting the engine may be returned to the first, higher speed setting.

In this way, by lowering the vehicle speed at which an engine is automatically shutdown in response to an initial disagreement between a sensed intake air temperature and a sensed engine coolant temperature, the engine running time may be prolonged to allow the intake air temperature sensor to be exposed to fresh air and provide a more reliable reading. Specifically, by allowing the engine to continue running at vehicle speeds at which it may have otherwise been shutdown, the IAT sensor may be exposed to fresh ambient air with reduced impact to the vehicle performance as well as to the operator's perception of engine run time.

Now turning to FIG. 4, an example routine 400 is shown for re-evaluating an intake air temperature following an initial disagreement between an estimated intake air temperature and an engine coolant temperature. The routine of FIG. 4 may be performed as part of the routine of FIG. 3, specifically, at step 322.

At 402, it may be confirmed that the vehicle has been operating at or above a threshold vehicle speed (threshold_1) for a duration (duration_1). The threshold vehicle speed may correspond to a vehicle speed that ensures the engine is running and that sufficient air is flowing over the intake air temperature sensor in the engine intake. In one example, it may be confirmed that the vehicle has been operating at or above 30 mph for 60 secs. In some embodiments, the threshold vehicle speed above which the vehicle needs to be operating for the selected IAT re-evaluation conditions to be confirmed may be the same as the second, lower vehicle speed at which the automatic engine shutdown is enabled following the initial disagreement. However, in other embodiments, all the vehicle speed thresholds may be distinct.

If the vehicle has not been operating at or above the threshold vehicle speed for the specified duration, then sufficient air flow over the IAT sensor may not be confirmed and the IAT sensor reading may remain unreliable. Thus, if the vehicle speed conditions are not confirmed, the routine may end and the IAT sensor reading may not be re-evaluated.

Upon confirming that the vehicle has been operating above the threshold vehicle speed for a duration, at 404, it may be confirmed that an intake air mass level flowing in the engine intake has been at or above a threshold level (threshold_2) for the duration (duration_1). In one example, it may be confirmed that the vehicle has been operating with an intake air mass level at or above 0.5 lb/min for 60 secs. As such, since a vehicle speed does not necessarily reflect engine operation in a hybrid electric vehicle, by confirming that the air mass level has been sufficiently high for the duration, the controller may better ensure that a sufficient mass of fresh air has actually passed over the IAT sensor. While the depicted example illustrates confirming that each of the vehicle speed and the intake air mass level have been at or above their respective thresholds for the same duration, it will be appreciated that in alternate embodiments, the threshold durations may be different. For example, it may be confirmed that the vehicle speed has been at or above the corresponding vehicle speed threshold for a first duration and that the intake air mass level has been at or above the corresponding intake air mass level for a second, different duration.

If the air mass level has not been at or above the threshold level for the specified duration, then sufficient air flow over the IAT sensor may not be confirmed and the IAT sensor reading may remain unreliable. Thus, if the air flow condition is not confirmed, the routine may end and the IAT sensor reading may not be re-evaluated.

Upon confirming that the intake air mass level has been above the threshold level for the duration, at 406, a tip-out event may be determined. Specifically, it may be determined if a tip-out event has occurred over the duration (duration_1). In one example, a tip-out event may be confirmed by air mass flow or vehicle speed going below the threshold amount. As such, if no tip-out event has occurred, then the routine proceeds to 412 to re-estimate the intake air temperature as sensed by the IAT sensor.

If a tip-out event is confirmed, than at 408, it may be determined whether it is a brief tip-out event. As such, a brief tip-out event may be confirmed if the air mass flow or vehicle speed have been below the threshold position for less than a threshold time (e.g., less than 5 secs). As such, a brief tip-out event may not substantially interrupt the temperature of the air flow over an IAT sensor. Thus, if a brief tip-out event is confirmed, then the routine proceeds to 412 to re-estimate the intake air temperature as sensed by the IAT sensor. In one example, the routine of FIG. 4 may use a leaky-bucket filter (or algorithm) to allow the re-evaluation routine to continue in the presence interruptions due to brief tip-out events.

If a brief tip-out event is not confirmed, then at 410, an extended tip-out event may be confirmed. This may include confirming that the air mass flow or vehicle speed have been below the threshold time (e.g., more than 5 secs). As such, an extended tip-out event may substantially impact the air flow over an IAT sensor and render the reading unreliable. Thus, if an extended tip-out event is confirmed, the routine may end and the IAT sensor reading may not be re-evaluated.

Thus, an intake air temperature is re-sensed by the IAT sensor and re-evaluated only if each of the selected vehicle operating conditions has been met, wherein the selected operating conditions include each of the vehicle operating above a threshold vehicle speed for a duration, an intake air mass level being above a threshold level for the duration, and no extended tip-out event having occurred over the duration. As elaborated previously at FIG. 3, if the re-sensed intake air temperature reading now agrees with the engine coolant temperature, no IAT sensor degradation may be determined. However, if the re-sensed intake air temperature continues to disagree with the engine coolant temperature, IAT sensor degradation may be determined.

In this way, during vehicle operation, when a first intake air temperature sensed before an engine start but after an engine soak disagrees with engine temperature, a controller may sense a second intake air temperature after selected vehicle operating conditions are met, and indicate intake air temperature sensor degradation based on the second intake air temperature also disagreeing with the engine temperature. Herein, the first or second intake air temperature disagreeing with the engine temperature includes an absolute difference between the engine temperature and the first or second intake air temperature being larger than a threshold difference.

In response to the first intake air temperature agreeing with the engine temperature, the controller may automatically shutdown the engine when a vehicle speed drops below a first, higher speed. In comparison, in response to the first intake air temperature disagreeing with the engine temperature, the controller may automatically shut down the engine when a vehicle speed drops below a second, lower speed. The controller may then reset the automatic shutdown of the engine to when the vehicle speed drops below the first speed once the second intake air temperature agrees with the engine temperature.

By re-evaluating the IAT sensor reading after prolonging engine running and confirming that sufficient fresh air mass has passed over the IAT sensor during the prolonged engine running, the IAT reading may be rendered more reliable and the integrity of the IAT sensor diagnostic routine may be enhanced. In addition, completion of the IAT sensor diagnostic routine is better enabled even if there is an initial disagreement between temperature readings.

Now turning to FIGS. 5A-B, example IAT sensor diagnostic routines that are run in a hybrid electric vehicle and corresponding adjustments to a vehicle speed threshold at which an automatic engine shutdown of the hybrid vehicle is enabled are shown at maps 500 and 520. Specifically, map 500 of FIG. 5A depicts a first example wherein a vehicle speed threshold is maintained in response to an initial agreement between an estimated intake air temperature and an estimated engine temperature. In comparison, map 520 of FIG. 5B depicts a second example wherein the vehicle speed threshold is lowered in response to an initial disagreement between an estimated intake air temperature and an estimated engine temperature.

Turning to FIG. 5A, map 500 illustrates changes in pedal position at plot 502, corresponding changes in vehicle speed at plot 504, and an indication of engine operation at plot 506.

Prior to t1, the engine may be off. In addition, the hybrid electric vehicle may be off. That is, the vehicle not be driven and may be parked. As a result, before t1, an engine soak may occur. The engine soak may be for a duration wherein the engine has cooled to an ambient temperature. At t, a vehicle key-on event may be confirmed, for example, due to the vehicle operator inserting a key in the ignition or pressing an engine start/stop button. In response to the key-on event, and further in response to a sufficient soak time having elapsed before the key-on request is received, a first vehicle start-up is performed and at t, an intake air temperature sensed by an IAT sensor is compared to an engine coolant temperature sensed by an ECT sensor. In the first vehicle start-up depicted at map 500, there may be an initial agreement between the sensed air temperature and the sensed engine temperature (that is, IAT=ECT). Specifically, an absolute difference between the estimated air temperature and engine temperature may be smaller than a threshold. Due to the initial agreement, no IAT sensor degradation may be determined and it may be indicated that the IAT sensor is functional.

Also based on the initial agreement, a vehicle controller may maintain a vehicle speed threshold for an automatic engine shutdown at a first, higher speed threshold 507. That is, the controller may be configured to automatically shut down the engine in response to a vehicle speed being below the first, higher threshold 507 responsive to agreement between air temperature and engine temperature sensed before the first vehicle start-up following the engine soak.

For example, between t1 and t2, due to the vehicle speed (plot 504) being at or below first threshold 507, the engine may remain shutdown, and the vehicle may be propelled via power from an electric motor (not shown). That is, the vehicle may be operating in an electric-only mode. At t2, due to a change in pedal position (plot 502) and a request for more torque, as well as request for a vehicle speed (plot 504) that is higher than first threshold 507, the engine may be restarted and run (plot 506). The engine may continue to be run until t3 when automatic engine shutdown conditions are met. A brief tip-out event 510 may have occurred between t2 and t3, as shown by a brief change in pedal position (plot 502) and a corresponding small drop in vehicle speed (plot 504). However, the brief tip-out event 510 may have been of sufficiently short duration such that the automatic engine shutdown is not impacted.

At t3, a battery SOC may be sufficiently high, the torque demand may be sufficiently low, and no request for air conditioning may be received. However, due to the vehicle speed (plot 504) falling below the first threshold speed 507, the engine may be automatically shutdown. As such, between t2 and t3, the hybrid electric vehicle may be operated in an engine-only mode or an engine-assist mode, based on other engine operating parameters. Then, after t3, the vehicle may resume operation via the electric motor.

In this way, following an initial agreement between estimated IAT and ECT, IAT sensor functionality is confirmed, and a vehicle speed threshold at which an automatic engine shutdown is enabled in a hybrid vehicle is maintained.

Turning now to FIG. 5B, map 520 illustrates changes in pedal position at plot 522, corresponding changes in vehicle speed at plot 524, and an indication of engine operation at plot 526.

Prior to t11, the engine may be off. In addition, the hybrid electric vehicle may be off. That is, the vehicle not be driven and may be parked. As a result, before t11, an engine soak may occur. The engine soak may be for a duration wherein the engine has cooled to an ambient temperature. At t11, a vehicle key-on event may be confirmed, for example, due to the vehicle operator inserting a key in the ignition or pressing an engine start/stop button. In response to the key-on event, and further in response to a sufficient soak time having elapsed before the key-on request is received, a second vehicle start-up is performed and at t11, an intake air temperature sensed by an IAT sensor is compared to an engine coolant temperature sensed by an ECT sensor. In the second vehicle start-up depicted at map 520, there may be an initial disagreement between the sensed air temperature and the sensed engine temperature (that is, IAT#ECT). Specifically, an absolute difference between the estimated air temperature and engine temperature may be larger than the threshold.

Due to the initial disagreement, IAT sensor re-evaluation may be required. Specifically, responsive to disagreement between air temperature and engine temperature from before the second vehicle start-up, the controller may be configured to re-sense air temperature after selected vehicle operating conditions are met (elaborated below), and indicate intake air temperature sensor degradation based on disagreement between the re-sensed air temperature and engine temperature.

Also based on the initial disagreement, a vehicle controller may lower a vehicle speed threshold for an automatic engine shutdown from the first, higher speed threshold 507 to a second, lower speed threshold 508. That is, the controller may be configured to automatically shut down the engine in response to vehicle speed being below the second, lower threshold 508 responsive to disagreement between air temperature and engine temperature from before a second vehicle start-up following the engine soak.

For example, between t11 and t12, due to the vehicle speed (plot 524) being at or below second threshold 58, the engine may remain shutdown, and the vehicle may be propelled via power from an electric motor (not shown). That is, the vehicle may be operating in an electric-only mode. At t12, due to a change in pedal position (plot 522) and a request for more torque, as well as request for a vehicle speed (plot 524) that is higher than second threshold 508, the engine may be restarted and run (plot 526). The engine may continue to be run until t13 when automatic engine shutdown conditions are met. Specifically, the engine may continue to be operated and may not be shutdown when the vehicle speed drops below first threshold 507 but remains above second threshold 508 (between t12 and t13), and may only be shutdown when the vehicle speed drops below second threshold 508.

At t13, a battery SOC may be sufficiently high, the torque demand may be sufficiently low, and no request for air conditioning may be received. However, due to the vehicle speed (plot 524) falling below the second threshold speed 527, the engine may be automatically shutdown. As such, between t12 and t13, the hybrid electric vehicle may be operated in an engine-only mode or an engine-assist mode, based on other engine operating parameters. Then, after t13, the vehicle may resume operation via the electric motor.

By lowering the vehicle speed threshold in response to the initial temperature disagreement, a duration of engine running may be prolonged (t12 to t13 is longer than t2 to t3). The controller may then reassess the IAT sensor reading at t13 upon confirming that selected vehicle operating conditions have been met. For example, the controller may confirm at t13 that the vehicle has been operating above a threshold vehicle speed 509 for a duration (in the current example, the duration may be a duration between t12 and t13), an air flow mass level being above a threshold level (not shown) for the duration, and no extended tip-out events having occurred over that duration. A brief tip-out event 530 may have occurred between t12 and t13, as shown by a brief change in pedal position (plot 522) and a corresponding small drop in vehicle speed (plot 524). However, the brief tip-out event 530 may have been of sufficiently short duration that the IAT sensor re-evaluation conditions are not impacted. In one example, the controller may have used a leaky-bucket algorithm to allow the re-evaluation conditions to continue being monitored and uninterrupted in the presence of brief interruptions due to the brief tip-out event 530.

Thus, at t13, in response to the selected conditions being met, it may be determined that sufficient fresh ambient air has passed over the IAT sensor and the controller may re-sense IAT. If there is a disagreement between the re-sensed air temperature and the engine temperature at 13, the controller may indicate IAT sensor degradation. However, if the re-sensed air temperature and the engine temperature agree when re-compared at t13, the controller may indicate no IAT sensor degradation.

As such, if an extended tip-out event occurs, no re-sensing and re-evaluation of IAT sensor reading may be performed at t13. For example, if the extended tip-out event is of a sufficiently long duration (as shown by extended tip-out event 532 in dashed and dotted lines), a gross interruption in air flow over the IAT sensor may be determined and the re-evaluation may be discontinued in view of a potentially unreliable IAT sensor reading.

In this way, by lowering the vehicle speed at which an engine is automatically shutdown in response to an initial disagreement between a sensed intake air temperature and a sensed engine coolant temperature, the IAT sensor may be exposed to fresh ambient air, and a more reliable reading may be provided upon re-sensing. By continuing to enable automatic engine shutdowns in a hybrid vehicle, albeit at a lower vehicle speed threshold, an IAT sensor diagnostic routine may be performed with reduced impact to vehicle performance and an operator's perception of engine run time. By re-evaluating the IAT sensor reading after prolonging engine running and confirming that sufficient fresh air mass has passed over the IAT sensor during the prolonged engine running, the IAT reading may be rendered more reliable and the integrity of the IAT sensor diagnostic routine may be enhanced. In addition, completion of the IAT sensor diagnostic routine is better enabled if there is an initial disagreement between temperature readings. Overall, an intake air temperature sensor may be reliably diagnosed in a hybrid vehicle with minimal intrusion of vehicle operation.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a hybrid vehicle, comprising:
during vehicle operation,
when intake air temperature, sensed by an intake air temperature sensor, before an engine start but after an engine soak, disagrees with engine temperature, lowering, by an engine controller, a vehicle speed threshold at which an automatic engine shutdown is enabled from a first, higher speed to a second, lower speed.

2. The method of claim 1, wherein lowering the vehicle speed threshold includes, automatically shutting down an engine when a vehicle speed drops below the second, lower speed when the sensed intake air temperature disagrees with the engine temperature; and
automatically shutting down the engine when the vehicle speed drops below the first, higher speed when the sensed intake air temperature agrees with the engine temperature.

3. The method of claim 2, wherein automatically shutting down the engine includes continuing to operate the vehicle using an electric motor.

4. The method of claim 1, wherein the engine temperature includes an engine coolant temperature, and wherein the intake air temperature disagreeing with the engine temperature includes an absolute difference between the sensed intake air temperature and the engine coolant temperature being higher than a threshold difference.

5. The method of claim 1, further comprising, re-sensing the intake air temperature after selected vehicle operating conditions are met since the engine start, and indicating intake air temperature sensor degradation based on the re-sensed intake air temperature relative to the engine temperature.

6. The method of claim 5, wherein the selected vehicle operating conditions include each of the vehicle operating above the second speed for a duration, an intake air mass level being above a threshold level for the duration, and no extended tip-out event over the duration.

7. The method of claim 6, wherein the indicating includes,
if the re-sensed intake air temperature agrees with the engine temperature, indicating no intake air temperature sensor degradation; and
if the re-sensed intake air temperature disagrees with the engine temperature, indicating intake air temperature sensor degradation.

8. The method of claim 7, wherein the re-sensed intake air temperature agreeing with the engine temperature includes an absolute difference between the re-sensed intake air temperature and the engine temperature being lower than a threshold difference, and wherein the re-sensed intake air temperature disagreeing with the engine temperature includes an absolute difference between the re-sensed intake air temperature and the engine temperature being higher than the threshold difference.

9. The method of claim 7, further comprising, in response to the indication of no intake air temperature sensor degradation, resetting the vehicle speed threshold at which the automatic engine shutdown is enabled from the second, lower speed to the first, higher speed.

10. A method, comprising:
during hybrid vehicle operation, when a first intake air temperature sensed by an intake air temperature sensor before an engine start but after an engine soak disagrees with engine temperature,
sensing a second intake air temperature after selected vehicle operating conditions are met; and
indicating intake air temperature sensor degradation based on the second intake air temperature disagreeing with the engine temperature via a diagnostic code or a malfunction indication light.

11. The method of claim 10, wherein the selected vehicle operating conditions include each of the vehicle operating above a threshold vehicle speed for a threshold duration, an intake air mass level being above a threshold level for the threshold duration, and no extended tip-out event occurring over the threshold duration.

12. The method of claim 10, wherein the first or second intake air temperature disagreeing with the engine temperature includes an absolute difference between the engine temperature and the first or second intake air temperature being larger than a threshold difference.

13. The method of claim 10, further comprising,
in response to the first intake air temperature agreeing with the engine temperature, automatically shutting down the engine when a vehicle speed drops below a first, higher speed; and
in response to the first intake air temperature disagreeing with the engine temperature, automatically shutting down the engine when a vehicle speed drops below a second, lower speed.

14. The method of claim 13, further comprising, in response to the second intake air temperature agreeing with the engine temperature, resetting automatic shutdown of the engine to when the vehicle speed drops below the first speed.

15. A hybrid vehicle system, comprising:
an engine including a first intake air temperature sensor for estimating an intake air temperature and a second temperature sensor for estimating an engine temperature;
an electric motor;
a battery; and
a controller with computer readable instructions for,
automatically shutting down the engine in response to vehicle speed being below a first, higher threshold responsive to agreement between air temperature and engine temperature sensed before a first vehicle start-up following a soak; and
automatically shutting down the engine in response to vehicle speed being below a second, lower threshold responsive to disagreement between air temperature and engine temperature from before a second vehicle start-up following a soak.

16. The system of claim 15, wherein the soak of the first vehicle start-up and the second vehicle start-up is of a duration wherein the engine has cooled to an ambient temperature.

17. The system of claim 15, wherein agreement between air temperature and engine temperature includes an absolute difference between the air temperature and engine temperature being smaller than a threshold, and wherein disagreement between air temperature and engine temperature includes the absolute difference between the air temperature and engine temperature being larger than the threshold.

18. The system of claim 15, wherein the controller includes further instructions for,
responsive to disagreement between air temperature and engine temperature from before the second vehicle start-up, re-sensing air temperature after selected vehicle operating conditions are met, and indicating first temperature sensor degradation based on disagreement between the re-sensed air temperature and engine temperature.

19. The system of claim 18, wherein the selected vehicle operating conditions include each of the vehicle operating above a threshold vehicle speed for a threshold duration, an intake air mass level being above a threshold level for the threshold duration, and no extended tip-out event occurring over the threshold duration.

\* \* \* \* \*